E. DUCHAMP.
Faucet.
No. 207,646. Patented Sept. 3, 1878.
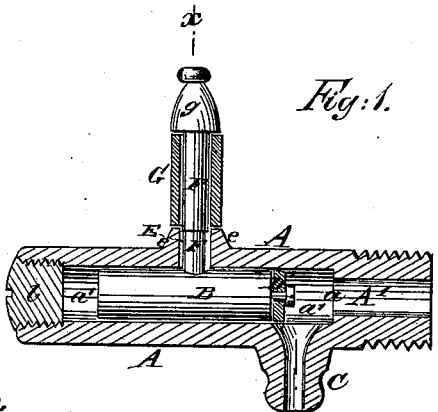
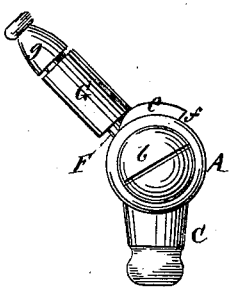
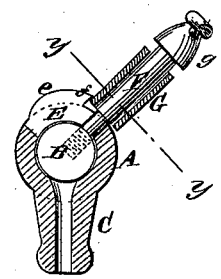
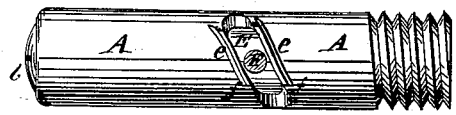
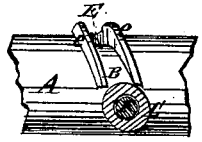
WITNESSES:
INVENTOR:
E. Duchamp
BY
ATTORNEYS.

UNITED STATES PATENT OFFICE.

EUGENE DUCHAMP, OF ST. MARTINVILLE, LOUISIANA.

IMPROVEMENT IN FAUCETS.

Specification forming part of Letters Patent No. 207,646, dated September 3, 1878; application filed July 24, 1878.

*To all whom it may concern:*

Be it known that I, EUGENE DUCHAMP, of St. Martinville, in the parish of St. Martin's and State of Louisiana, have invented a new and Improved Faucet, of which the following is a specification:

In the accompanying drawing, Figure 1 represents a longitudinal vertical section of my improved faucet with its valve opened. Fig. 2 is a top view of the same, the valve-handle being removed. Fig. 3 is an end view of the same when the valve is open. Fig. 4 is a cross-section of the same, through the line $xx$ of Fig. 1, when the valve is closed. Fig. 5 is a detail section on the line $yy$ of Fig. 4.

Similar letters of reference indicate corresponding parts.

The object of my invention is to furnish a cheap and durable faucet, simple in construction, and not liable to get out of order.

The invention consists in a cylindrical pipe having a valve-seat and side nozzle, and through its side an inclined slot sided by a stop-flange, in combination with a cylindrical slide-valve having a handle projecting through the said slot, said handle being surrounded by an oval sliding and turning sleeve, which serves as a bolt to lock it against the said stop-flange, as will be hereinafter described.

A is a short pipe, threaded on the outside at one end, to adapt it to be screwed in place. The outer end of the hole A' in the pipe A is enlarged, forming a shoulder, $a$, to serve as valve-seat for the cylindrical valve B, which is inserted in the enlarged portion or valve-chamber $a'$ from the outer open end of the latter, the said end being then closed up by a screw-plug, $b$. C is the discharge-nozzle, connecting with the inner end of the chamber $a'$, on the under side of the pipe A. D is a rubber or leather packing or washer fastened to the inner end of the valve B, to form the tightening surface against the valve-seat $a$.

Across the upper side of the pipe A is cut a slot, E, through which the valve-handle F is inserted from the outside, and its threaded end screwed into a hole or socket in the valve B, and thus secured to the latter.

The valve is opened and closed by lateral movements of the handle F in the slot E, which latter guides the handle, and is cut at a sufficient inclination to the axis of the faucet to cause the valve to slide in its axial line a distance sufficient to uncover the whole opening of the nozzle C, while the handle F is moved from one end to the other of the slot E. On each side of the slot E is a flange, $e$, gradually rising at the outer end of the slot, and ending abruptly at the inner end of the slot, (or that nearest to the valve-seat $a$,) thus forming a stop or shoulder, $f$.

The handle F is surrounded by a sleeve, G, as much shorter than the stem it is sliding upon as the height of the stop $f$, and prevented by the knob $g$ from falling off the handle. The lower end of the sleeve G is made oval in cross-section, so that when the handle is brought in the position of Figs. 4 and 5, to close the valve, the sleeve may be slipped down to bear against the stops $f$ of the flange $e$, and by a slight turn tightened by bringing its elongated side like a cam in contact with the stops $f$, thereby at the same time pressing the valve tight against its seat $a$.

To open the valve B it is only necessary to slightly turn back the sleeve G and raise it above the stops $f$, and then move the handle toward the outer end of the slot E.

Having thus described my invention, I claim as new and desire to secure by Letters Patent—

The pipe A, provided with the valve-seat $a$, nozzle C, and inclined slot E, sided by the stop-flange $e$, in combination with the cylindrical slide-valve B, having the handle F projecting through the said slot E, said handle being surrounded by the oval sliding and turning sleeve G, to lock it against the stop $f$, substantially as shown and described.

EUGENE DUCHAMP.

Witnesses:
A. POLEYNARD,
L. DURAND.